Helge Fabian Rost
Per Harry Elias Claesson
INVENTORS

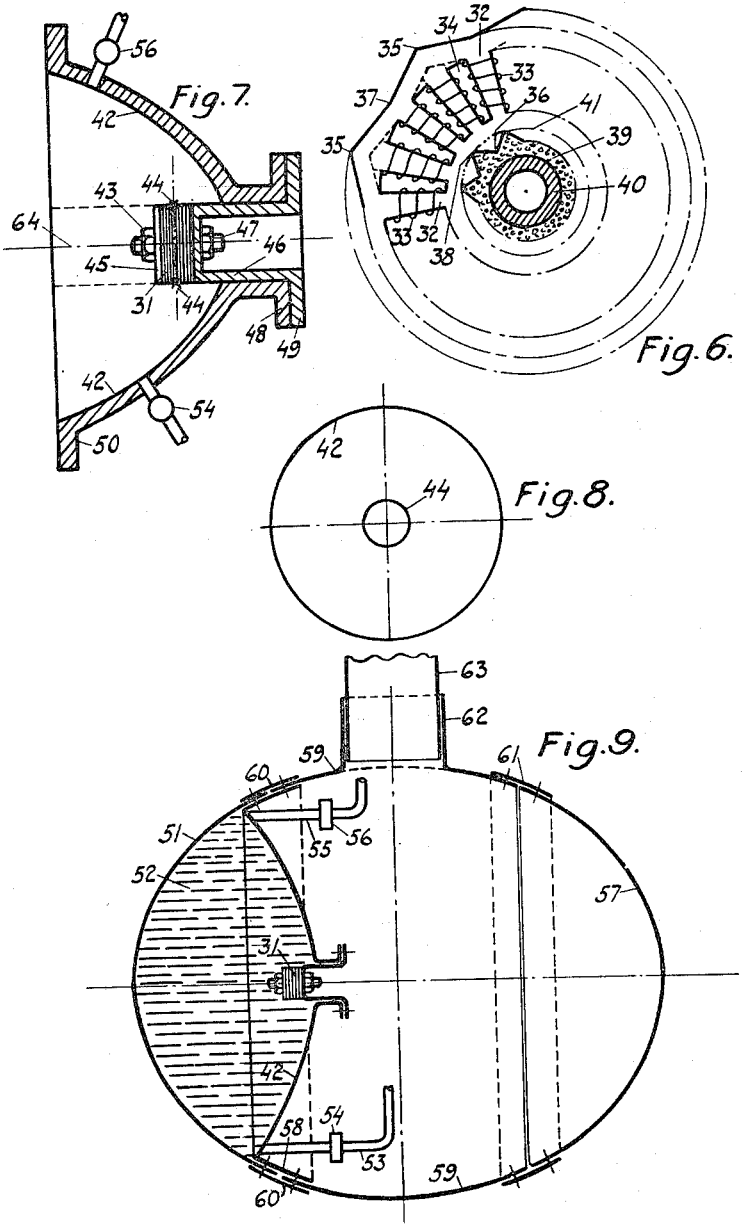

UNITED STATES PATENT OFFICE 2,398,117

MAGNETOSTRICTIVE OSCILLATOR

Helge Fabian Rost, Djursholm, and Per Harry Elias Claesson, Jakobsberg, Sweden

Application April 29, 1942, Serial No. 440,964
In Sweden May 3, 1941

3 Claims. (Cl. 177—38.6)

The present invention relates to a pressure wave transmitter and receiver preferably with a broad resonance curve to transform electrical energy to supersonic pressure waves and vice versa and is particularly suitable for the transmission of frequency modulated waves for the determination of directions and/or distances of submarines, mines and submarine objects.

The invention can also be used in sonic depth indication systems and for all kinds of submarine signals, for example in submarine ultrasonic signal-transmitters in narrow passages and at the coasts for guiding ships in fog and the like.

The invention refers also to devices for the transmission and reception of sharply directed pressure waves of great energy for continuous patrolling of a certain section below water in a way similar to that of light rays from a light house.

Transmitters and receivers of broad resonance curve are obtained according to one embodiment of the present invention by dividing a magnetostrictive oscillator into several units that electrically and mechanically are more or less coupled to another in about the same way as the circuits of electric filters.

A broad resonance curve can according to the invention also be obtained by making an ultrasound oscillator oscillate in a medium under increased pressure.

The different units have different points or centers of resonance, similar to radio circuits. The units can therefore be fairly loosely coupled to one another.

The width of the resonance curve depends partly on the damping or the resonance characteristics of the different units and partly on the degree of coupling between the different units.

By having the magnetostrictive units oscillate in a medium with increased pressure, for example 5 to 10 atmospheres, the advantage is obtained that each square unit of the emitting pressure surface can be loaded with an increased amount of energy without any danger of cavity-forming.

Accordingly smaller surfaces of emission can be used and a considerably higher degree of efficiency can be obtained in the present embodiments of the invention than in known pressure wave oscillators.

The invention and its way of functioning will be understood in connection with the description of the accompanying drawings of which:

Fig. 6 shows a ringshaped magnetostrictive oscillator for the transmission and reception of sharply directed supersonic pressure waves.

Fig. 7 is a lateral, partly sectional view of a device for the transmission and reception of sharply directed pressure waves by means of the oscillator shown in Fig. 6, the active surfaces of oscillation of which are located in the circle-shaped line of focus of a paraboloidal reflector of special construction.

Fig. 8 shows a front view of the curve form of the line of focus of the parabolic reflector.

Fig. 9 shows partly in section a streamlined rotatable hollow body provided with a ringshaped or cylindrically shaped magnetostrictive oscillator as shown in Fig. 6 and located in a paraboloidal reflector substantially as shown in Fig. 7, said reflector being provided with a window to allow pressure waves to pass through, and the reflector being provided with a pressure medium.

Figure 1:
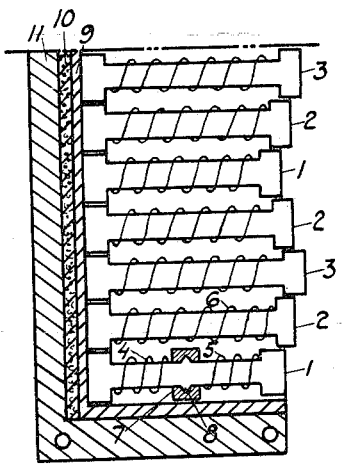
Fig. 1 shows the general principle of a magnetostrictive oscillator with individual, electrically coupled magnetostrictive units.
Figure 2:
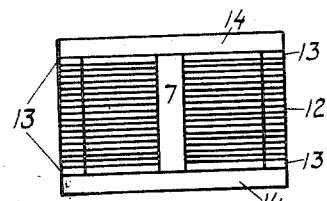
Fig. 2 is a lateral view of Fig. 1.

In Figs. 1 and 2, elements 1, 2 and 3 are laminated cores of magnetostrictive material of varying lengths. The core 1 is thus the shortest and core 3 the longest. Each core is wound with a conducting electromagnetic winding 6.

Eventually each core can be provided with two windings connected in series, as shown on the lower core 1, which by means of studs 8 at its center is attached to members 7 so that the core freely can swing about the center of its longitudinal axis. Eventually the cores can freely rest at their bases on the elastic layer 9 of for example rubber, and the air impregnated layer 10, consisting of, for example, rubber sponge with enclosed air. The whole magnetostrictive unit is surrounded by a cover 11 and the insulated laminated members 12 of the magnetostrictive cores are held by members 13 and the plates 14 in known way.

The different windings can be connected in series or parallel in order to obtain the desired effect.

Upon oscillation of the respective cores the energy is irradiated from the free ends when the respective cores are elongated and contracted along their longitudinal axis, while on account of the rear air cushion all energy is reflected in the direction of the free end. Instead of having the free surfaces at different levels, these surfaces can be located at the same front level, while the rear levels can be stepwise arranged.

The thin laminated sheets can be stamped out in desired shape from suitable magnetostrictive metal, for example annealed nickel, Monel metal of about 70% Ni and 30% Cu, nichrome or cobalt and iron alloy, preferably in annealed form.

Figure 3:
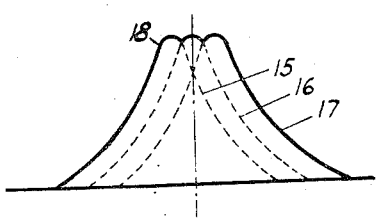
Fig. 3 is a resonance curve of an oscillator composed of a plurality of magnetostrictive units.

In Fig. 3, 18 represents a broad resonance curve, composed of the three individual resonance curves 15, 16 and 17 corresponding to the magnetostrictive oscillators 1, 2 and 3 of Fig. 1.

Figure 4:
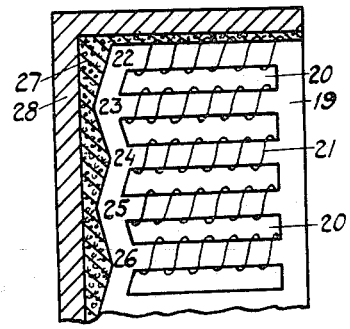
Fig. 4 shows a part of an embodiment of a magnetostrictive oscillator of broad resonance curve with mechanically and electrically coupled circuits.

Fig. 4 shows an embodiment of a magnetostrictive oscillator 19 according to the present invention with a continuously broad resonance curve. The figure shows part of a stamped laminated core in which the holes 20 are stamped out to receive the respective windings 21 on legs 22, 23, 24, 25, 26, etc. Of these legs 22, 24, 26, etc. are short and the legs 23, 25, etc. are long. The short legs oscillate with a certain resonance frequency, while the long legs oscillate with another lower resonance frequency. These oscillations are represented by a resonance curve of a width corresponding, for example, to the curves 15 and 16 shown in Fig. 3. The respective oscillating circuits are here both mechanically and electrically coupled to each other. 27 is an air cushion of, for example, porous rubber sponge. 28 is a casing to hold the magnetostrictive oscillator.

Figure 5:
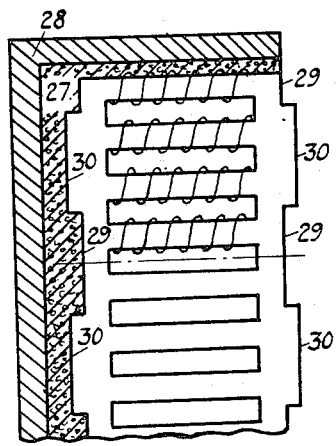
Fig. 5 shows part of another embodiment of a magnetostrictive oscillator of broad resonance curve with mechanically and electrically coupled circuits.

Fig. 5 is another embodiment of a magnetostrictive oscillator, of which the long cores 30 are symmetrically located on both sides of the short cores 29, so that each group can oscillate independently. The mechanical coupling of this embodiment is looser than that shown in Fig. 4. 27 is an air cushion and 28 is a casing to hold the oscillator in the same way as shown in Fig. 4.

Fig. 6 shows a ringshaped magnetostrictive oscillator for radial emission of pressure waves of broad resonance curve. A laminated core 31 (Fig. 7) is formed from stamped laminated sheets of the form shown in Fig. 6, where 34 are holes and 32 legs on which are wound the electromagnetic windings 33 which then can be coupled in a known way to obtain the greatest longitudinal change of length.

In order to obtain a broad resonance curve, for example, every second leg 35 can be made longer than the intermediate legs 37, whereby a resonance curve of a certain width is obtained. If a still broader curve is desired, three legs of different lengths with suitable distribution about the circumference of the ringshaped transmitter can be arranged.

The inside of the ring can be made circular shaped, as shown by the line 41 or also the corresponding long legs can be prolonged so that they symmetrically obtain the shape shown at 36 and 38. In this way a relatively weak mechanical coupling is obtained between the differently long legs 35 and 37 which in such a way are alternately and symmetrically located in the ring. Each leg is supposed to freely oscillate with its own resonant frequency at the same time as it is mechanically and electrically coupled to the adjacent leg.

Between the inner part of the core and the fastening bolt or tube 40 there is rubber or rubber sponge 39 with air located to cause total reflection in order to obtain all available energy at the outside of the ring.

In Fig. 7 the ringshaped oscillator 31 of Fig. 6 is centrally located in the circleshaped line of focus of a paraboloidal shaped reflector 42 of the following construction. The parabolic curve 42 with focus 44 is part of a complete parabola. A parabolic curve is cut in two equal parts along its center line 64 and each parabola-half moved to the positions shown in the figure. If the parabola-halves, in their new positions with the respective focuses, are made to rotate about the axis 64, a paraboloidal surface with circular shaped line of focuses 44 is obtained.

If now as shown in the figure the magnetostrictive oscillator 31 is centrally located so that the center plane of the core passes through the said circle of focuses and the outside average diameter of the core coincides with the circle of focuses, the greatest part of the emitted energy will be reflected by the paraboloidal surfaces 42 as sharply directed pressure waves in the medium, in which the oscillator and the reflector surfaces are situated.

Upon being mounted the reflector should preferably be placed so that its outside surface is surrounded by air, so that total reflection from the paraboloidal surfaces is obtained and the transmission or reception can only take place in the desired direction.

The magnetostrictive oscillator can be placed in the line of focuses as shown in the figure, whereby the core is held between the metal disk 45 and the bottom of cylinder 46 by means of the bolt 47 and nuts 43.

The cylinder 46 is by means of the cuff 49 closely fastened to the rear cuff 48 of the reflector. The device can in known way be mounted on a ship for the transmission in vertical, horizontal or any other direction. Eventually the reflector can be provided with cocks 54 and 56 to admit liquid pressure medium to the reflector and at the same time eject air to prevent cavity formations. The reflector can at its front opening be provided with a window of metal or of a synthetic resin of low specific gravity that does not differ very much from the density of water, for example polystyrol, a polyacrylic acid derivate, or a mixture of polymerized esters or the like.

If the reflector is provided with a window in the direction of transmission, the inner part of the reflector can eventually be filled with oil in which the pressure waves through the window are communicated to the surrounding water in which the whole device is submerged.

By the application of overpressure on the pressure medium within the reflector a greater suppression or quenching of the waves, less risk for cavitation, a broader resonance curve and a greater efficiency are obtained.

Fig. 8 shows the form of the reflector shown in Fig. 7 in a front view, whereby the reflecting paraboloidal surface is located between the circleshaped line of focuses 44 and the outside circle 42.

In Fig. 9 is shown a streamlined rotatable body with paraboloidal reflector and ringshaped magnetostrictive oscillator with broad resonance curve and which preferably is intended for frequency modulation generally described in our copending patent application Ser. No. 360,362, filed Oct. 9, 1940, and which frequency modulated waves can be transmitted by means of said magnetostrictive oscillator of broad resonance curve for the determination of direction and distance according to a method described in our co-pending patent application Ser. No. 361,226, filed Oct. 15, 1941, of which this application is a continuation-in-part.

57—59 is a streamlined hollow shell to give the least possible resistance and in order to avoid turbulence when the shell rotates in water.

The emitting surfaces of the magnetostrictive oscillator 31 are located at the circular focuses of the paraboloidal reflector 42 as shown in Fig. 7. The reflector 42 is provided with rings 58 to serve in part as seat for the window 51 and in part to fasten the reflector to the shell 59. A ring 60 of metal provided with the necessary tightening material heremetically closes the reflector. The reflector room is filled with a pressure medium 52, for example water or preferably an insulating oil which by the pipe 53 and cock 54 can be admitted to the room, while the air can be ejected through the pipe 55 and cock 56.

By applying an overpressure through the respective pipes the pressure medium can be exposed to an overpressure of a plurality of atmospheres, whereby a greater density of the pressure medium can be obtained and cavity phenomena impeded. A greater efficiency for both transmission and reception is besides obtained as already has been mentioned.

By means of the tube 63 attached to collar 62 electrical and other conductors can be brought above the water surface. The tube 63 is connected to suitable bearings either in front of or on each side of a ship. The device can be provided with an arrangement to hoist it up and down, or it can eventually be submerged in the water from a compartment in the bottom of the ship. In order to modulate voice frequencies on the pressure wave a fairly broad resonance curve is needed. For amplitude modulation there is needed about 3000 cycles on the upper and 3000 cycles on the lower side band, wherefore a width of about 6000 cycles is needed for good voice transmission on a pressure wave in water. The invention thus makes it possible to obtain an excellent voice transmission in water which has not been possible before.

The present invention is not limited to the embodiments shown, but the invention refers to each of the details mentioned in the specification, either alone or in combination.

Thus the paraboloidal reflector with preferably circular focuses is useful not only for ringshaped magnetostrictive oscillators with inherent broad resonance curve, but the reflector can also be used for any kind of ringshaped or cylindrical magnetostrictive or other kind of oscillator, even such a one with sharp resonance curve for the emission or reception of a certain fixed wave length.

The invention is not limited to the shown paraboloidal reflector with a circular curve of focuses, but any other paraboloid surface of reflector with any kind of line of focuses can be used, for example a straight line. Embodiments can thus be imagined, whereby square laminations of a magnetostrictive unit can be located so that the magnetostrictive effect from two opposite sides can be directly utilized, whereby the two opposite sides are placed at the straight lines of focuses of two opposite paraboloidal surfaces adapted to transmit sharply directed curtains of pressure waves in a certain plane.

Furthermore the over-pressure characteristic feature of the invention is not limited to magnetostrictive oscillators, but serves equally well for all kinds of pressure wave oscillators, also for piezoelectric and mechanical ones.

The walls of the parabaloidal reflector shown in Fig. 7 and Fig. 9 are dimensioned in a known way so that they substantially reflect the pressure waves.

The window 51 shown in Fig. 9 should on the contrary have such a thickness with respect to the wave length in the medium of said window that the pressure waves can pass the same substantially without reflection.

Having now particularly described and ascertained the nature of our said invention and in what manner the same is to be performed, we declare that what we claim is:

1. The combination with a ringshaped magnetostrictive oscillator, energy exchange taking place radially at the outside periphery of said oscillator, of a paraboloid reflector having a circular-shaped curved of foci, the outside periphery of said oscillator substantially coinciding with the said circular shaped curve of foci.

2. In a magnetostrictive oscillating device to be used for the transmission or the reception of pressure waves frequency modulated within a relatively broad frequency band, a magnetostrictive pressure wave transmitting member in contact with a transmitting medium, said member consisting of a plurality of laminations each including a plurality of oscillating elements of different lengths so that a common broad responsive curve for the entire oscillation device is obtainable by composite oscillations of the several elements.

3. A magnetostrictive oscillating device to be used for the transmission or the reception of pressure waves frequency modulated within a relatively broad frequency band and comprising a plurality of laminations, each including a plurality of oscillating elements forming integral parts of said lamination, the lengths of adjacent elements in each lamination being different from each other, so that a common broad responsive resonance curve for the entire oscillation device is obtainable by composite oscillations of the several elements.

HELGE FABIAN ROST.
PER HARRY ELIAS CLAESSON.